(12) United States Patent
Hsu et al.

(10) Patent No.: US 8,973,014 B2
(45) Date of Patent: Mar. 3, 2015

(54) INTER-DEVICE COMMUNICATION TRANSMISSION SYSTEM AND METHOD THEREOF

(71) Applicant: Quanta Computer Inc., Tao Yuan Shien (TW)

(72) Inventors: Yung-Chi Hsu, Zhongli (TW);
Chien-Hung Lin, Kaohsiung (TW);
Yang-Sheng Wang, Taoyuan (TW);
Shih-Chieh Lo, Kaohsiung (TW)

(73) Assignee: Quanta Computer Inc., Tao Yuan Shien (TW)

( * ) Notice: Subject to any disclaimer, the term of this patent is extended or adjusted under 35 U.S.C. 154(b) by 9 days.

(21) Appl. No.: 13/933,304

(22) Filed: Jul. 2, 2013

(65) Prior Publication Data

US 2014/0298353 A1 Oct. 2, 2014

(30) Foreign Application Priority Data

Mar. 28, 2013 (TW) .............................. 102111124 A (51) Int. Cl.
*G06F 3/00* (2006.01)
*H04B 1/00* (2006.01)
*G06F 9/54* (2006.01)

(52) U.S. Cl.
CPC ........................................ *G06F 9/54* (2013.01)
USPC .............. 719/313; 719/319; 719/329; 455/41

(58) Field of Classification Search
CPC ................ G06F 2221/2111; G06F 2221/2129;
G06F 3/1454; H04N 21/4222; H04N 21/4126; H04N 21/41407; H04N 5/04
See application file for complete search history.

(56) References Cited

U.S. PATENT DOCUMENTS

| | | | | |
|---|---|---|---|---|
| 2005/0058108 | A1* | 3/2005 | Ekberg et al. | 370/338 |
| 2007/0283050 | A1* | 12/2007 | Savage | 709/248 |
| 2012/0136949 | A1* | 5/2012 | Virani et al. | 709/206 |
| 2012/0265434 | A1* | 10/2012 | Woodard et al. | 701/423 |

* cited by examiner

*Primary Examiner* — Tuan Dao
(74) *Attorney, Agent, or Firm* — McClure, Qualey & Rodack, LLP (57) ABSTRACT

Disclosed are an inter-device communication transmission system and a method. The inter-device communication transmission system includes a first-communication platform disposed in a first electronic device and a second-communication platform disposed in a second electronic device. When the first electronic device installs an application program, the first-communication platform selectively transmits the application program to the second-communication platform, so that the second-communication platform can install the application program. When the second electronic device executes a function of the application program, the second-communication platform transmits a command corresponding to the function to the application program installed in the first electronic device through the first-communication platform, and the command is executed by the application program to retrieve data. The first-communication platform transmits the data to the second-communication platform, and the second-communication platform transfers the data to the application program in the second electronic device for display of the data.

7 Claims, 7 Drawing Sheets

INTER-DEVICE COMMUNICATION TRANSMISSION SYSTEM AND METHOD THEREOF

CROSS-REFERENCE TO RELATED APPLICATION

This application claims the benefit of Taiwan Patent Application No. 102111124, filed on Mar. 28, 2013, in the Taiwan Intellectual Property Office, the disclosure of which is incorporated herein in its entirety by reference.

BACKGROUND OF THE INVENTION

1. Field of the Invention

The present invention relates to a communication transmission system, and more particularly to the inter-device communication transmission system and a method thereof capable of performing an inter-device communication without being limited by an interface or a library dedicated to the platform of each device.

2. Description of the Related Art

As mobile devices advance, data exchange and communication between different devices have increasingly higher demands, such as applications among smart watches, smart remote controllers and telematics systems and mobile devices. However, each of present existing communication architectures for heterogeneous devices (such as Sony-MN2, I'm Watch, MOTOACTV, etc.) defines an application program interface (API) or library itself for the communication between different devices (such as a screen display or a function call) or require a specific platform or frame (such as a custom APP store) for the development of communications (such as I'm Watch). Since the present existing communication architectures for heterogeneous devices require specific commands for the communications between devices or the screen display, the interactive function between the devices has relatively more limitations. In addition, the interactions between the devices are defined in the API, so that the requirements for customized application programs or diversified interactions cannot be fulfilled, and application program developers require additional learning time to learn the APIs defined by different platforms, which is the main reason why the communication architecture for heterogeneous devices is not attractive to developers. If it is necessary to add more interactions, each device needs an updated API or library, thus causing a difficult maintenance of the API or library of each device.

In view of the aforementioned drawbacks of the prior art, the inventor of the present invention designed and developed an inter-device communication transmission system, a method thereof, and an inter-device application program installation method to overcome the drawbacks of the prior art and improve the industrial applicability.

SUMMARY OF THE INVENTION

To achieve the objective of the present invention, the present invention provides an inter-device communication transmission system applied in a communication transmission between a first electronic device and a second electronic device, and the inter-device communication transmission system comprises a first-communication platform and a second-communication platform. The first-communication platform is installed in the first electronic device. The second-communication platform is installed in the second electronic device. When the first electronic device installs an application program, the first-communication platform selectively transmits the application program to the second-communication platform, and the second-communication platform installs the application program automatically; and when the second electronic device executes a function of the application program, the second-communication platform transmits a command corresponding to the function to the first-communication platform, and the first-communication platform transfers the command to the application program in the first electronic device to access data; and the first-communication platform transmits the data to the second-communication platform, and the second-communication platform transfers the data to the application program in the second electronic device for the display of the data.

To achieve the objective of the present invention, the present invention further provides an inter-device communication transmission method applied in an inter-device communication transmission system, and the inter-device communication transmission system includes a first-communication platform and a second-communication platform, and the first-communication platform has a first device label and is installed in a first electronic device, and the second-communication platform has a second device label and is installed in a second electronic device. The method comprises the steps of: providing an application program having a first mode corresponding to the first device label and a second mode corresponding to the second device label; installing the application program in the first electronic device, wherein the application program identifies the first device label and displays at the first electronic device using the first mode corresponding to the first device label; selectively transmitting the application program to the second-communication platform by the first-communication platform, so that the second-communication platform installs the application program automatically; and identifying the second device label by the application program, and displaying at the second electronic device using the second mode corresponding to the second device label.

The inter-device communication transmission system and method and the inter-device application program installation method of the present invention have one or more of the following advantages:

(1) The inter-device communication transmission system uses the original command of the application program for the communication between heterogeneous devices to avoid interactions primarily based on API or library, so that application program developers can focus their efforts on software function design instead of the technical details of communicating with the operating system or other programs and expedite the development of application programs significantly.

(2) The application program developers can design different execution modes in advance according to the features of different devices (such as the screen size or hardware specification) when the same application program is developed for different devices, so that the application program can identify the device label of an electronic device and show different interfaces and functions among different devices.

(3) The communication platform of the inter-device communication transmission system allows users to install, update, and delete an application program of an electronic device from a user end while automatically installing, updating or deleting the application program of a communication platform at a destination end, so as to lower the level of difficulty of maintaining the application program of heterogeneous devices, and control and maintain the version of the application program between the heterogeneous devices effectively.

DESCRIPTION OF THE PREFERRED EMBODIMENTS

The technical characteristics, contents, advantages and effects of the present invention will be apparent with the detailed description of a preferred embodiment accompanied with related drawings as follows. It is noteworthy that same numerals are used for representing respective same elements in the drawings.

Figure 1:
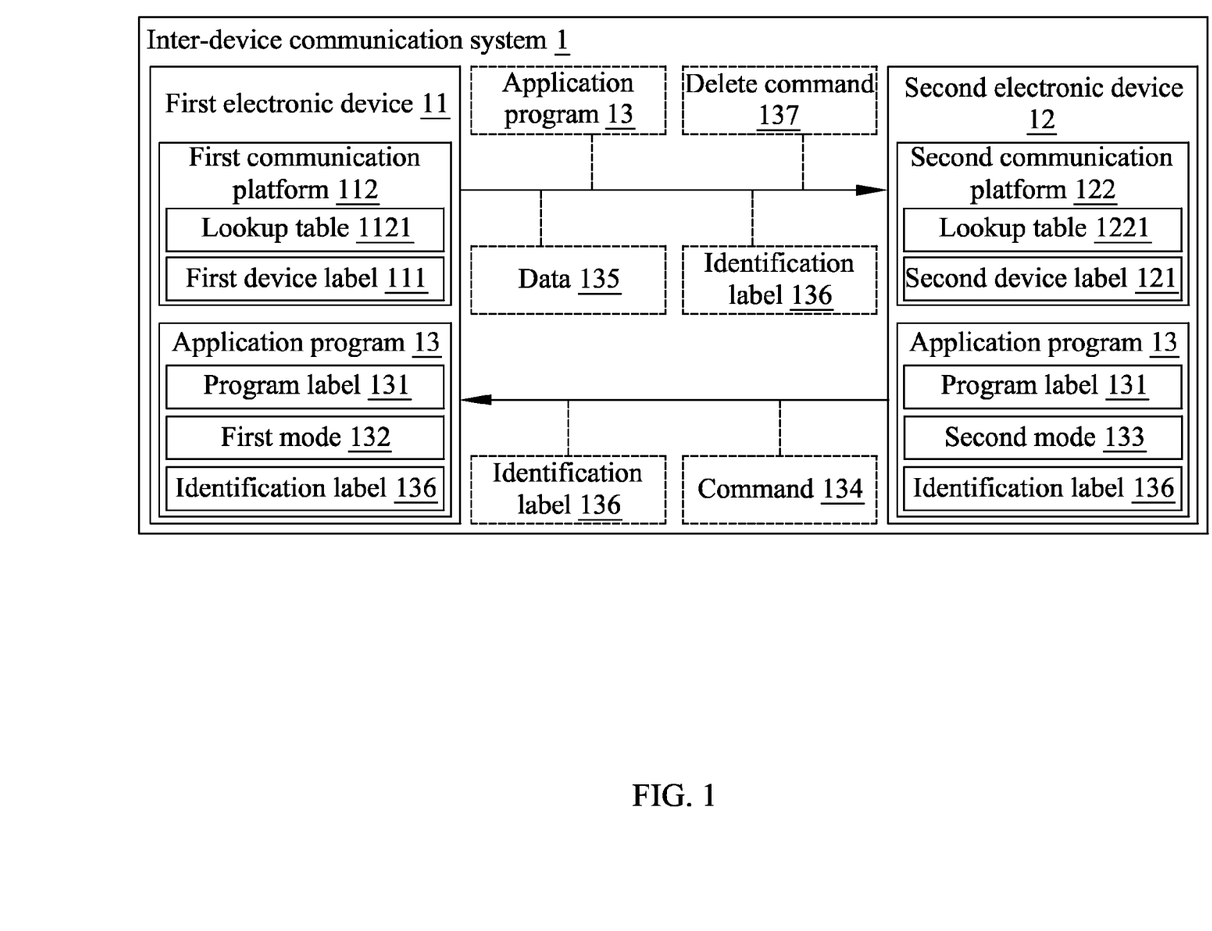
FIG. 1 is a block diagram of an inter-device communication transmission system of the present invention.

With reference to FIG. 1 for a block diagram of an inter-device communication transmission system of the present invention, the inter-device communication transmission system 1 of the present invention is applied in a communication transmission between a first electronic device 11 and a second electronic device 12. The inter-device communication transmission system 1 includes a first-communication platform 112 and a second-communication platform 122. The first-communication platform 112 is installed in the first electronic device 11 and includes a device label such as a first device label 111; and the second-communication platform 122 is installed in the second electronic device 12 and includes a device label such as a second device label 121. Wherein, the first electronic device 11 can be a Smartphone or a tablet PC, and the second electronic device 12 can be a smart watch. The first-communication platform 112 and the second-communication platform 122 can be an application program provided for users to install by themselves or embedded in a main board of an electronic device in a form of firmware, but the present invention is not limited to the aforementioned arrangements only. In an embodiment, the first-communication platform 112 having the first device label 111 is installed in the first electronic device 11 (as a factory default); and the second-communication platform 122 having the second device label 121 is loaded from an application program supply platform (such as APP store or Google play) by users and installed in the second electronic device 12. In an embodiment, the inter-device communication transmission system 1 further comprises a third electronic device (not shown in the figure) such as a smart remote controller or a telematics system for downloading the second-communication platform 122 having the second device label 121 or a communication platform having another device label (such as the third communication platform having the third device label) through the application program supply platform (such as APP store or Google play) in the third electronic device in order to communicate with the first electronic device 11 and/or the second electronic device 12.

In this embodiment, application program developers make the application program 13 in different electronic devices to provide different execution modes (i.e. interfaces and functions) according to the screen size or hardware specification of each electronic device. If the application program 13 is installed in different electronic devices, the application program 13 determines the desired execution mode of each electronic device according to the device label of the communication platform of each electronic device. The application program 13 of this embodiment has a first mode 132 corresponding to the first device label 111 of the first electronic device 11 and a second mode 133 corresponding to the second device label 121 of the second electronic device 12.

In short, when a user installs the application program 13 in the first electronic device 11, the application program 13 is displayed in the first electronic device 11 in the first mode 132 corresponding to the first device label 111 included in the first-communication platform 112. When the user installs the application program 13 in the second electronic device 12, the application program 13 is displayed in the second electronic device 12 in the second mode 133 corresponding to the second device label 121 included in the second-communication platform 122. For example, the application program 13 has a larger screen or a more powerful function in the first mode 132 of the first electronic device 11 (as shown in FIG. 2(b)), and the application program 13 has a smaller screen or a simpler function in the second mode 133 of the second electronic device 12 (as shown in FIG. 2(c)). In an embodiment, an application program developer can store a device label-mode list or table in the application program 13, and the device label-mode list can store different execution modes corresponding to different device labels, so that when the application program 13 is installed in different electronic devices, the execution mode can be determined according to the device labels of different electronic devices. It is noteworthy that different device labels can be set to the same execution mode. For example, if the Smartphones manufactured by different manufacturers have the same screen size, then the application program 13 can be displayed on different Smartphones by the same execution mode.

In a preferred embodiment, the first electronic device 11 has a wireless and/or cable network transmission function and/or short-distance wireless transmission function, and the second electronic device 12 has a short-distance wireless transmission function for connecting the first electronic device 11. For example, the wireless network transmission function is a WiFi or mobile communication function, and the short-distance wireless transmission function is a Bluetooth or WiFi function, but the invention is not limited to the aforementioned functions only. When a user uses the inter-device communication transmission system 1 of the present invention, the user matches the first electronic device 11 and the second electronic device 12 in a pair by Bluetooth to establish a connection between the two electronic devices 11, 12, and then downloads an application program 13 to the first electronic device 11 by connecting to an application program supply platform (such as APP store or Google play) or website using a wireless or cable networking method (such as connecting a Micro-USB to a notebook computer for a network connection). When the user installs the application program 13 in the first electronic device 11, the first-communication platform 112 searches the application program 13 and determines whether the application has a specific program label 131, if so, then the first-communication platform 112 transmits the application program 13 to the second-communication platform 122 via a wireless transmission method, so that the second-communication platform 112 can execute an installation procedure of the application program 13, or else the first-communication platform 112 does not transmit the application program 13 to the second-communication platform 122; in other words, only the first electronic device 11 just installs the application program 13. The way of determining the existence of a specific program label 131 can distinguish whether the application program developed by the developer is simply used in a single electronic device (such as the Smartphone) only or the application program is used in a plurality of electronic devices (such as the Smartphone and the smart watch). Wherein, the program label 131 can be a program code or an identification code defined by the developer of the inter-device communication transmission system 1. If the application program developer wants to develop an application program for a plurality of inter-device electronic device, then the developer has to store the defined program code or identification code in the application program and allows the first-communication platform 112 to search for the code, so as to determine whether or not to transmit the application program to other communication platforms.

After the second electronic device 12 has installed the application program 13, the user can execute a function of the application program 13 by the second mode 133 in the second electronic device 12. Once the user executes a function in the second mode 133 through the second electronic device 12, the second-communication platform 122 transmits the command 134 corresponding to the function and an identification label 136 corresponding to the application program 13 to the first-communication platform 112 via a wireless transmission method, and the first-communication platform 112 identifies the identification label 136 and transfers the command 134 to the application program 13 in the first electronic device 11 corresponding to the identification label 136, so that the application program 13 in the first electronic device 11 can execute the command 134. For example, the command of pressing and uploading "LIKE" to a server of Facebook to obtain updated data 135 (such as the cumulative number of "LIKE"), so as to complete command 134. In a preferred embodiment, the user can generate the data 135 through the application program 13 of the first electronic device 11. Wherein, the identification label 136 can be a package name of the application program 13, and the package name is unique; in other words, different application programs correspond to different identification labels respectively. To prevent the first-communication platform 112 and the second-communication platform 122 from transmitting the command 134 and the data 135 to an application program other than the first-communication platform 112 and the second-communication platform 122 for the execution of the command 134 or the display of the data 135 by mistake. In other words, both of the first electronic device 11 and the second electronic device 12 may install a plurality of application programs, so that the identification label 136 can be used for confirming the command (or function) issued from a particular application program and confirming the corresponding display of data by a particular application program.

After the application program 13 of the first electronic device 11 accesses the data 135, the first-communication platform 112 can transmit the data 135 and the identification label 136 of the application program 13 to the second-communication platform 122 via a wireless transmission method, so that the second-communication platform 122 transfers the data 135 to the application program 13 corresponding to the identification label 136 in the second electronic device 12, and the application program 13 displays the data 135 in the second mode 133.

When the user deletes the application program 13 in the first electronic device 11, the first-communication platform 112 can transmit the identification label 136 and the delete command 137 of the application program 13 to the second-communication platform 122 via a wireless transmission method, so that the second-communication platform 122 identifies the identification label 136 and deletes the application program 13 corresponding to the identification label 136 in the second electronic device 12 according to the delete command 137. When the user installs the updated file of the application program 13 in the first electronic device 11, the first-communication platform 112 can transmit the identification label 136 of the application program 13 and the updated file to the second-communication platform 122, so that the second-communication platform 122 identifies the identification label 136. If the application program 13 corresponding to the identification label 136 is installed in the second electronic device 12, the second-communication platform 122 can execute an installation procedure of the updated file. In an embodiment, the first-communication platform 112 and the second-communication platform 122 have a lookup table 1121 created therein for recording the application programs installed and the corresponding identification labels in the first electronic device 11 and the second electronic device 12.

Therefore, the inter-device communication transmission system 1 of the present invention can lower the level of difficulty of maintaining the communication application program of the inter heterogeneous devices significantly, and the users simply manage and maintain the application program 13 in the first electronic device 11 to install, delete and update the application program 13 in the second electronic device 12 simultaneously to facilitate the control and maintenance of the version of the application program 13 in the second electronic device 12.

Figure 2:
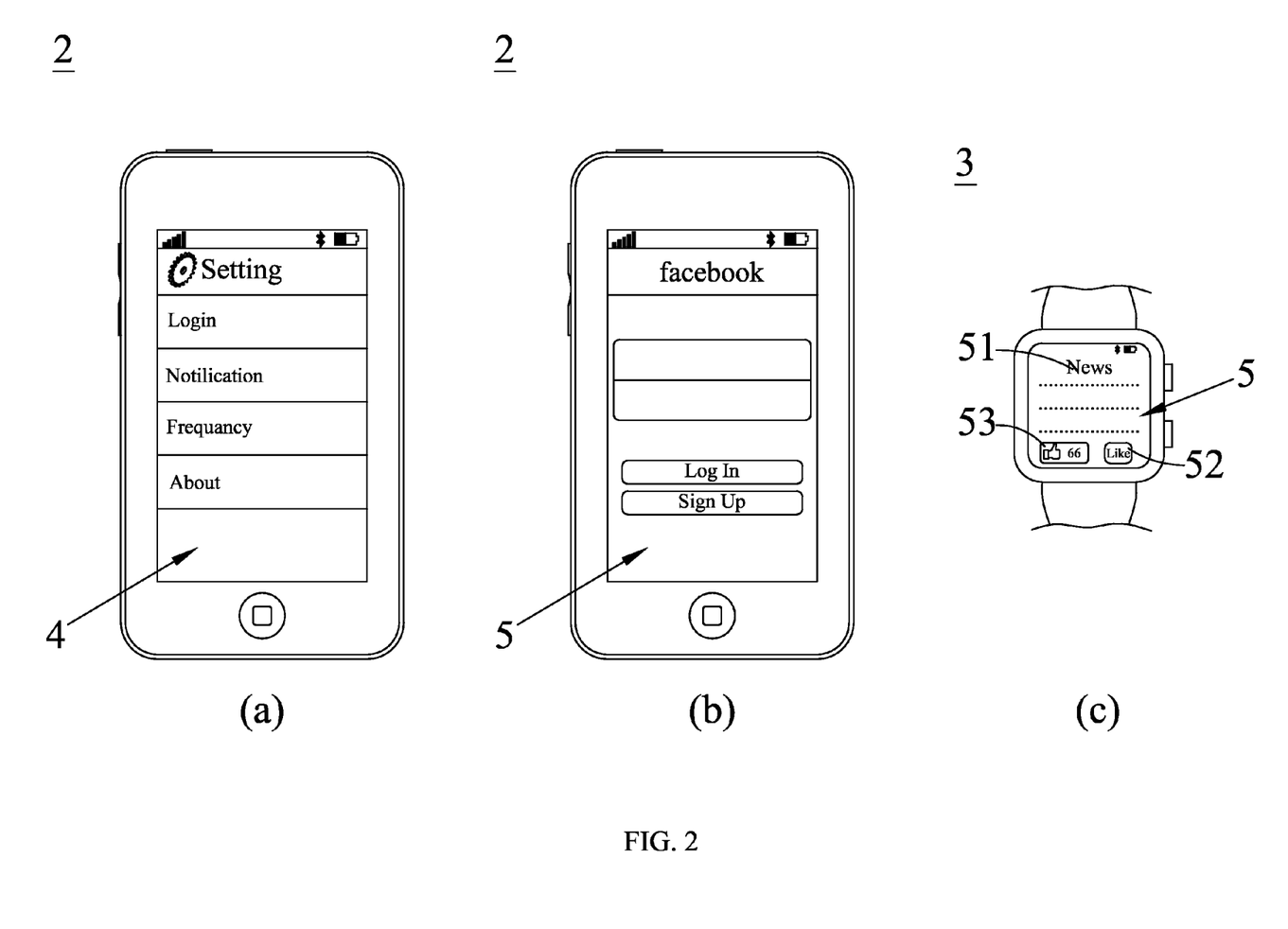
FIGS. 2(a), 2(b) and 2(c) are first, second and third schematic diagrams of an inter-device communication transmission system in accordance with a first preferred embodiment of the present invention respectively.

With reference to FIGS. 2(*a*), 2(*b*) and 2(*c*) for the first, second and third schematic views of the inter-device communication transmission system of the first preferred embodiment of the present invention respectively, a Smartphone 2 is used as an example of the first electronic device 11, and a smart watch 3 is used as an example of the second electronic device 12, and a social network 5 (such as Facebook) is used as an example of the application program 13 for purpose of illustrating the present invention. In addition, the inter-device communication transmission system 1 of the present invention can be applied in a communication transmission between the Smartphone 2 and the smart watch 3.

In this preferred embodiment, the first-communication platform 4 is installed in the Smartphone 2, and the second-communication platform (not shown in the figure) is installed in the smart watch 3, and the Smartphone 2 and the smart watch 3 have installed the application program of the social network 5 by the application program installation method as shown in FIG. 1, and the identification label of application program has been installed in the lookup tables of the first-communication platform 4 and the second-communication platform. When a user wants to use the inter-device communication system 1 of the present invention, the user needs to establish a connection between the Smartphone 2 and the smart watch 3 by a Bluetooth or wireless network, and then the user can start the application program of the social network 5 by inputting a user account and a password to log in the social network 5 as shown in FIG. 2(*b*). When the Smartphone 2 logs on the social network 5 to access the updated data 51 (such as the latest article or message) of the social network 5 and display the updated data 51 on a page of the Smartphone 2, the first-communication platform 4 transmits the data 51 and the identification label of the social network 5 to the smart watch 3 via a wireless transmission method, so that the second-communication platform can identify the identification label of the social network 5 and transfer the data 51 to the social network 5 in the smart watch 3 for a display as shown in FIG. 2(c). Therefore, the user can browse the article or message of the social network on the smart watch 3. If the user clicks a "LIKE" button 52 on the smart watch 3, the second-communication platform transmits both the "LIKE" command for execution and the identification label of the social network 5 to the first-communication platform 4, and then the first-communication platform 4 identifies the identification label of the social network 5 and transfers the command to the social network 5 of the Smartphone 2 to execute the command. When the Smartphone 2 executes the "LIKE" command, an updated data (such as the cumulative number 53 of the LIKE) are accessed from the server of FACEBOOK through the wireless network, and then the first-communication platform 4 transmits both the updated data executed by the command and the identification label of the social network 5 back to the second-communication platform, so that the second-communication platform can identify the identification label and transfer the data to the social network 5 in the smart watch 3 for the display of the updated data, and the user can view the updated cumulative number 53 after the LIKE button 52 on the smart watch is clicked.

Wherein, the way of logging in the social network 5 is not limited to the login by the Smartphone 2. If the application program developer designs the login function in an execution mode of the smart watch 3, the user can also login the application program of the social network 5 in the smart watch 3 directly after the Smartphone 2 and the smart watch 3 establish a connection by inputting a user account and a password. After the user inputting the user account and the password, the second-communication platform transmits the user account, the password, the command for logging in the social network 5, and the identification label of the social network 5 to the first-communication platform for logging in the social network 5 through the first-communication platform 4. Then, the social network 5 in the Smartphone 2 accesses the updated data 51 of the social network 5, such as from a remote server, and finally transmits the data 51 to the social network 5 in the smart watch 3 for a display according to the aforementioned method.

Figure 3:
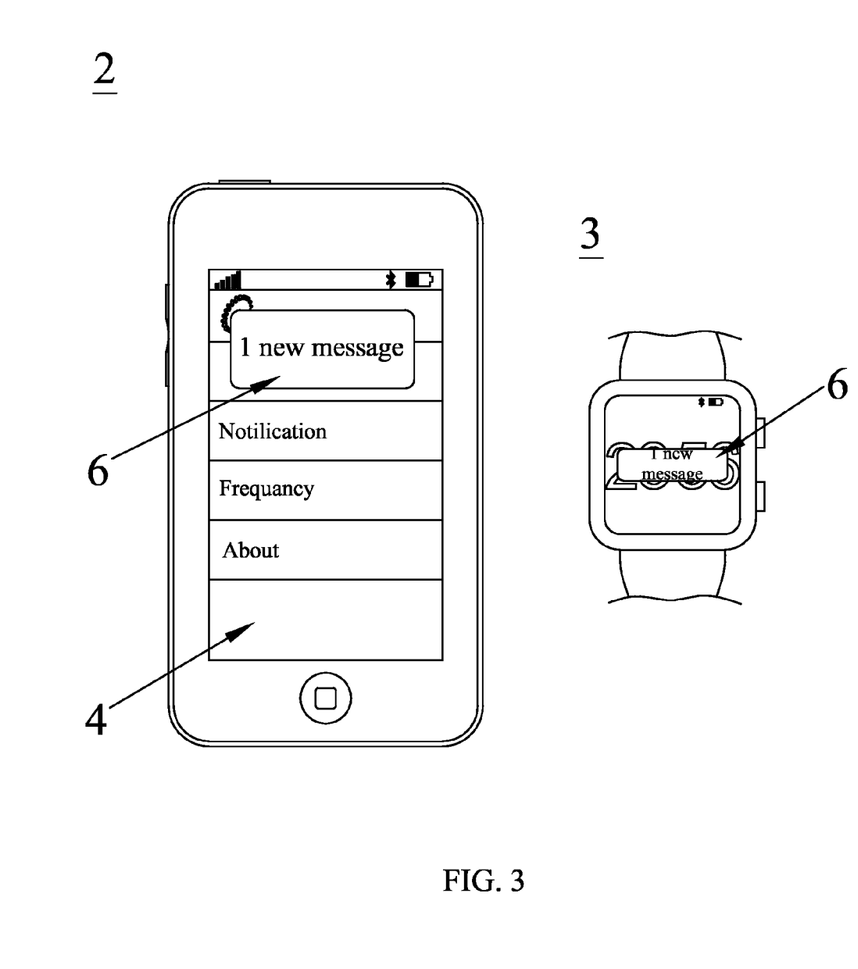
FIG. 3 is a first schematic view of an inter-device communication transmission system in accordance with a second preferred embodiment of the present invention.
Figure 4:
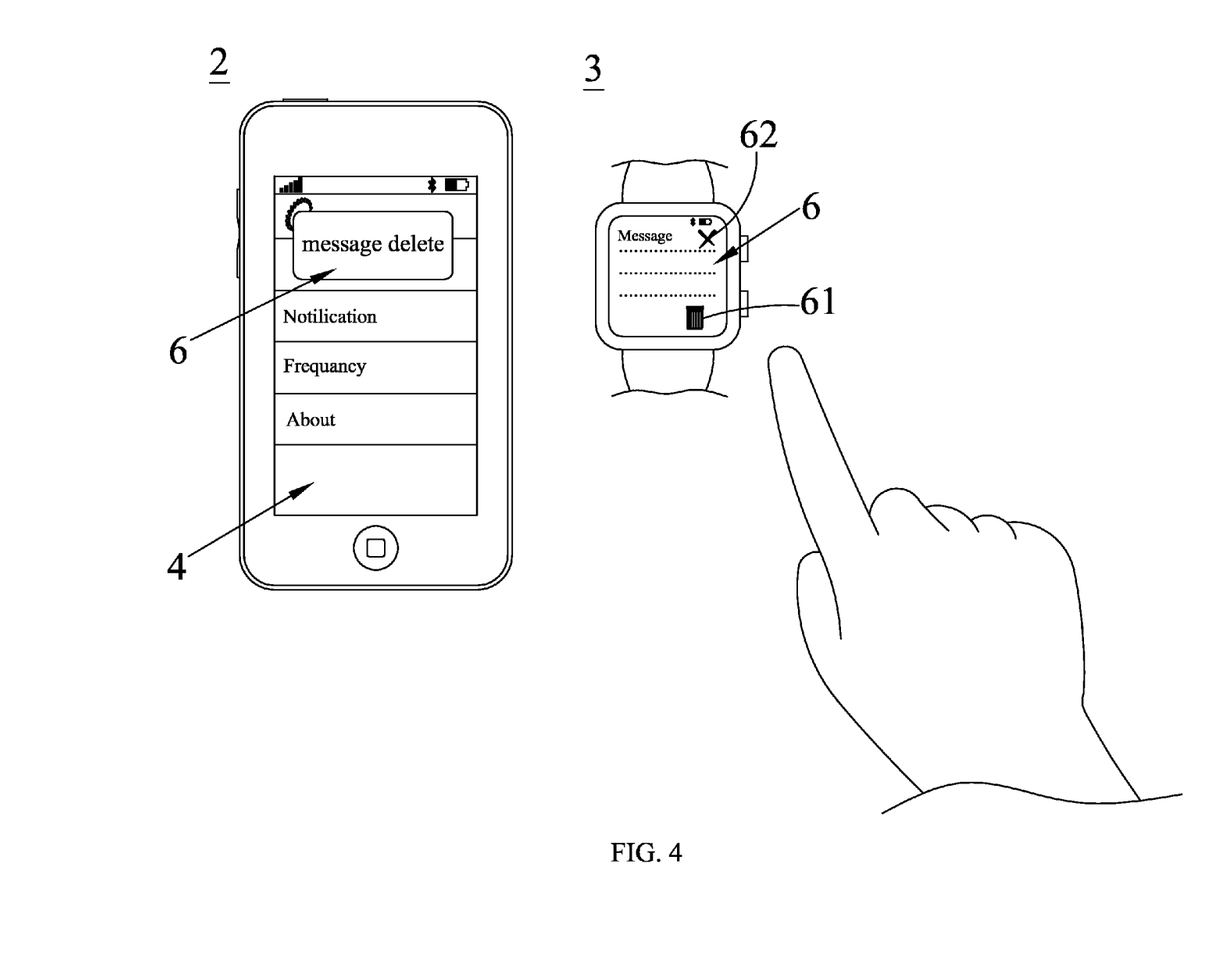
FIG. 4 is a second schematic view of an inter-device communication transmission system in accordance with the second preferred embodiment of the present invention.

With reference to FIGS. 3 and 4 for the first and second schematic views of an inter-device communication transmission system in accordance with the second preferred embodiment of the present invention respectively, the difference between the second preferred embodiment and the first preferred embodiment resides on that the application program 13 of the second preferred embodiment adopts a short message service (SMS) program 6 as an exemplary aspect. When the Smartphone 2 receives a new short message, the first-communication platform 4 receives a command to transmit a new message and an identification label of the SMS program 6 to the second-communication platform of the smart watch 3, and the second-communication platform identifies the identification label and transfers the command "receiving a new message" to the SMS program 6 corresponding to the identification label in the smart watch 3 for the execution, and a message frame "1 new message" is displayed in the smart watch 3 as shown in FIG. 3.

Further, when the user clicks the message frame "1 new message" in the smart watch 3, the second-communication platform transmits a command "displaying new message content" and an identification label of the SMS program 6 to the first-communication platform 4, and the first-communication platform 4 identifies the identification label and executes the command "displaying new message content" by the SMS program 6. In other words, the first-communication platform 4 transmits both the content of the short message and the identification label of the SMS program 6 to the second-communication platform, and the second-communication platform identifies the identification label and displays the content of the short message in the SMS program 6 of the smart watch 3. After the user has viewed the content of the short message from the smart watch 3, the user can click a DELETE button 61 to delete the short message, or click an EXIT button 62 to exit the SMS program 6. If the user deletes the short message by clicking the DELETE button 61 of the smart watch 3, through the inter-device communication transmission system 1 of the present invention, the SMS program 6 of the Smartphone 2 also deletes the short message in the Smartphone 2 as shown in FIG. 4.

Figure 5:
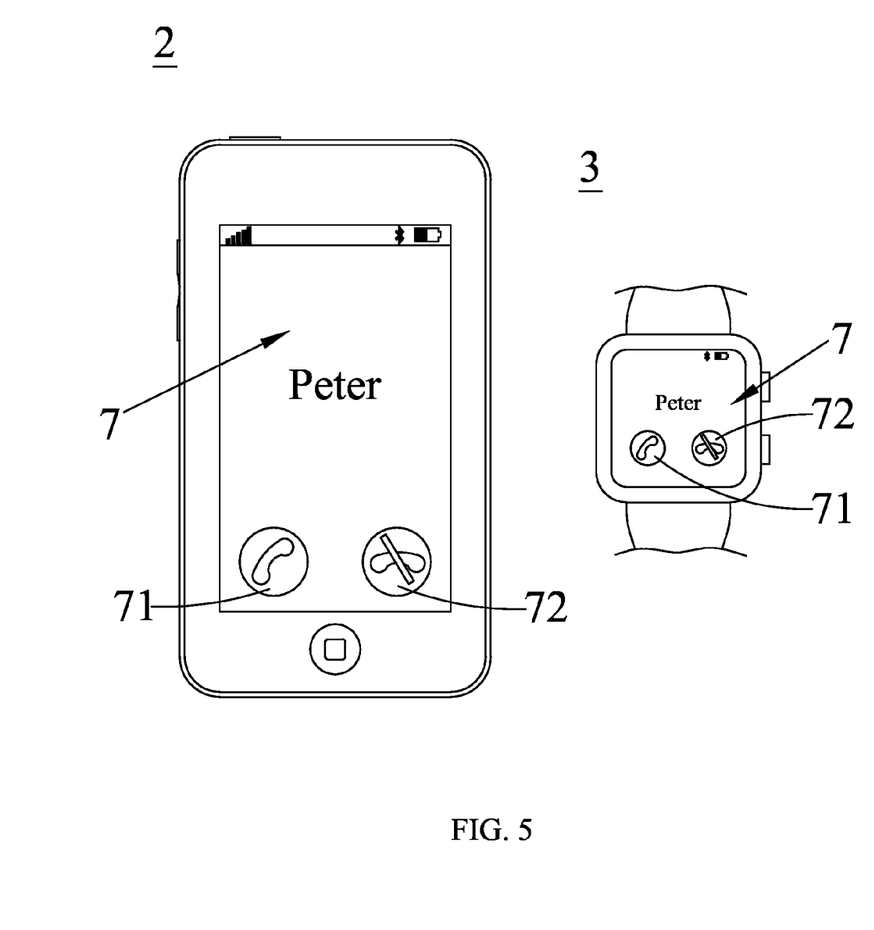
FIG. 5 is a schematic view of an inter-device communication transmission system in accordance with a third preferred embodiment of the present invention.

With reference to FIG. 5 for a schematic view of an inter-device communication transmission system in accordance with the third preferred embodiment of the present invention, the difference between the first preferred embodiment and the second preferred embodiment resides on this preferred embodiment using a caller ID program 7 as an exemplary aspect of the application program 13. When the Smartphone receives a telephone call from Peter, the first-communication platform in the Smartphone 2 transmits the command "Peter's call" and the identification label of the caller ID program 7 to the second-communication platform in the smart watch 3, and the second-communication platform in the smart watch 3 identifies the identification label, and transfers the command "Peter's call" to the caller ID program 7 for the execution to display a message "Peter's call", and the user can click a CALL RECEIVING button 71 or a CALL REFUSING button 72 for picking or not picking up Peter's call selectively. After the user has clicked the CALL RECEIVING button 71 or the CALL REFUSING button 72, the second-communication platform transmits the command of "receiving call" or "refusing call" and the identification label of the display program 7 to the first-communication platform, so that the Smartphone 2 can execute the command.

It is noteworthy to point out that when the user clicks the "CALL RECEIVING" button 71 in the smart watch 3, the user can receive the call directly from the smart watch 3 or use a Bluetooth earphone to receive the call, but the present invention is not limited to the aforementioned arrangements. In addition, the names of various execution commands as described in the foregoing preferred embodiment are provided for facilitating the description of the present invention and distinguishing the execution commands and the application programs from one another, but the names of commands used in the preferred embodiments are not intended for limiting the invention.

Figure 6:
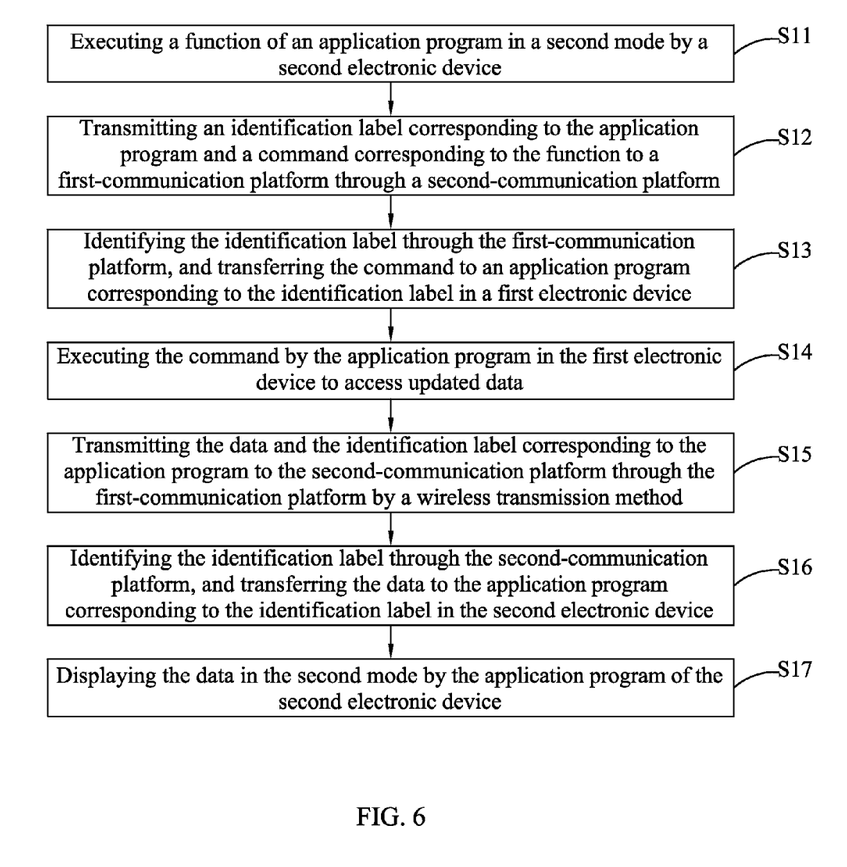
FIG. 6 is a flow chart of an inter-device communication transmission method of the present invention.

With reference to FIG. 6 for a flow chart of the inter-device communication transmission method of the present invention, the inter-device communication transmission method comprises the following steps:

S11: Executing a function of an application program in a second mode by a second electronic device, wherein the second electronic device executes the application program in the second mode according to a second device label in this preferred embodiment;

S12: Transmitting an identification label corresponding to the application program and a command corresponding to the function to a first-communication platform through a second-communication platform;

S13: Identifying the identification label through the first-communication platform, and transferring the command to an application program corresponding to the identification label in a first electronic device;

S14: Executing the command by the application program in the first electronic device to access updated data; wherein the application program of first electronic device displays the updated data in a first mode according to the first device label; wherein preferably through the wireless network to access the updated data;

S15: Transmitting the data and the identification label corresponding to the application program to the second-communication platform through the first-communication platform by a wireless transmission method;

S16; Identifying the identification label through the second-communication platform, and transferring the data to the application program corresponding to the identification label in the second electronic device; and S17: Displaying the data in the second mode by the application program of the second electronic device.

The details and implementation method of the inter-device communication transmission method of the present invention have been described in the block diagram and previous section of the inter-device communication transmission system, and thus will not be repeated.

Figure 7:
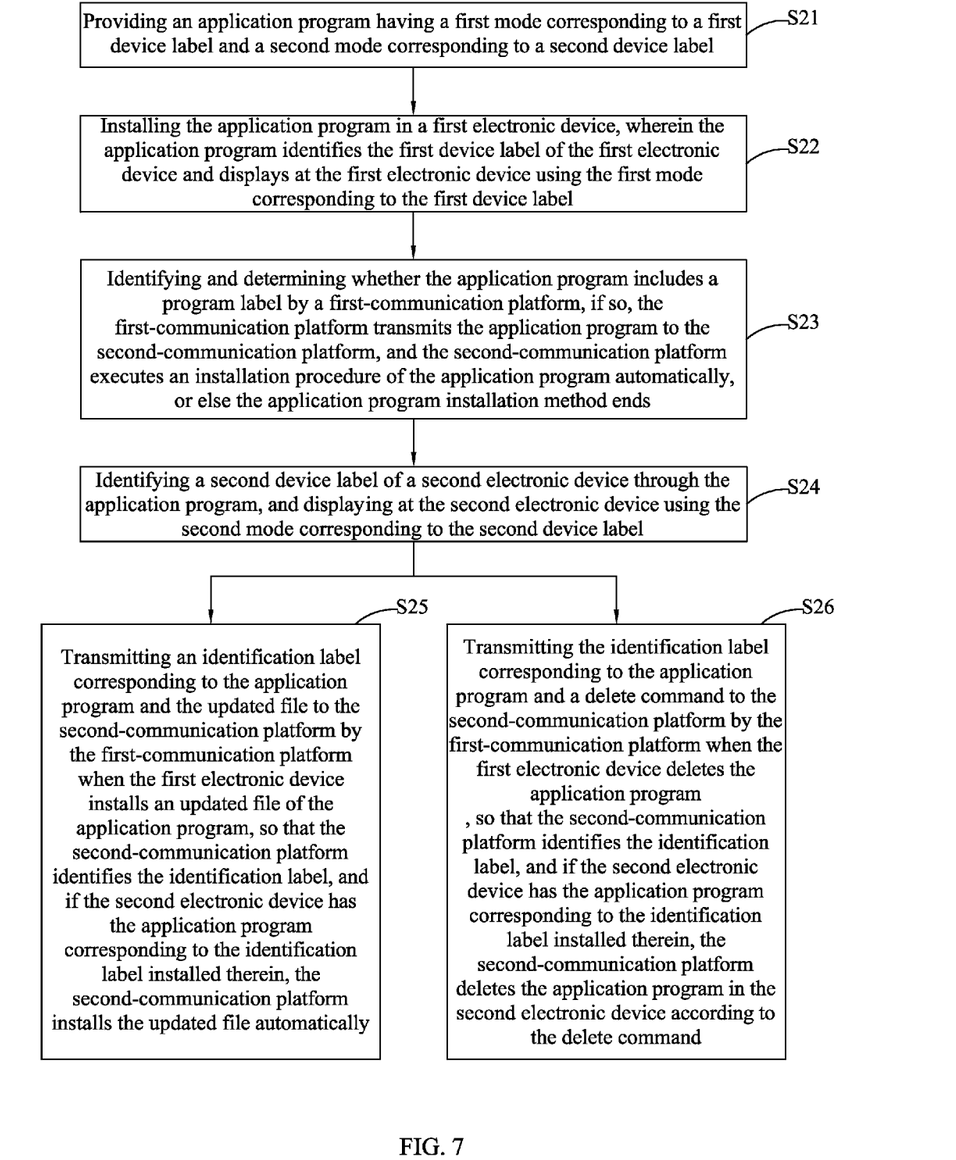
FIG. 7 is a flow chart of an inter-device application program installation method of the present invention.

With reference to FIG. 7 for a flow chart of an inter-device application program installation method of the present invention, the inter-device application program installation method comprises the following steps:

S21: Providing an application program having a first mode corresponding to a first device label and a second mode corresponding to a second device label;

S22: Installing the application program in a first electronic device, wherein the application program identifies the first device label in the first electronic device and displays at the first electronic device using the first mode corresponding to the first device label;

S23: Identifying and determining whether the application program includes a program label by a first-communication platform, if so, the first-communication platform transmits the application program to the second-communication platform, and the second-communication platform executes an installation procedure of the application program automatically, or else the application program installation method ends;

S24: Identifying a second device label of a second electronic device through the application program, and displaying at the second electronic device using the second mode corresponding to the second device label;

S25: Transmitting an identification label corresponding to the application program and the updated file to the second-communication platform by the first-communication platform when the first electronic device installs an updated file of the application program, so that the second-communication platform identifies the identification label, and if the second electronic device has the application program corresponding to the identification label installed therein, the second-communication platform installs the updated file automatically; and S26: Transmitting the identification label corresponding to the application program and a delete command to the second-communication platform by the first-communication platform when the first electronic device deletes the application program, so that the second-communication platform identifies the identification label, and if the second electronic device has the application program corresponding to the identification label installed therein, the second-communication platform deletes the application program in the second electronic device according to the delete command The details and implementation method of the inter-device application program installation method of the present invention have been described in the block diagram and previous section of the inter-device communication transmission system, and thus will not be repeated.

In summation of the description above, if the inter-device communication transmission system of the present invention is used and the application program developer develops the same application program for different devices, different execution modes can be designed according to the features of different devices, so that the application program can have different interfaces and functions in different devices. When a user installs the application program in different devices, the application program can identify the device label in the electronic device to determine which execution mode should be used for the display on the electronic device by the user. In addition, the inter-device communication transmission system of the present invention uses the original commands of the application program for the communication between the inter heterogeneous devices to prevent the application program developers from being limited by the interaction mainly based on the API or library, so that the developers can focus their efforts on software function design instead of the technical details of communicating with the operating system or other programs and expedite the application program development significantly. In addition, the first-communication platform of the inter-device communication transmission system of the present invention can detect the execution status of the application program of the first electronic device, so that the first-communication platform can transmit the application program or the updated file to the second electronic device for the installation when the user installs or updates an application program of the first electronic device. If the user deletes the application program in the first electronic device, the first-communication platform can transmit the command of deleting the application program to the second-communication platform, and the second-communication platform can delete the application program in the second electronic device automatically. Therefore, the invention can reduce the level of difficulty of maintaining the communication application program of the inter heterogeneous devices, and users simply need to manage the first electronic device to achieve the effects of installing, updating and deleting the application program of the second electronic device, and facilitating the control and maintenance of the version of the application program.

What is claimed is:

1. An inter-device communication transmission system, applied in a communication transmission between a first electronic device and a second electronic device, the inter-device communication transmission system comprising:

a first-communication platform, installed in the first electronic device; and a second-communication platform, installed in the second electronic device, wherein the second electronic device has a short-distance wireless transmission function for connecting the first electronic device, wherein when an application program is installed in the first electronic device, the first electronic device executes the first-communication platform to selectively transmit the application program to the second-communication platform of the second electronic device, and the second electronic device executes the second-communication platform to install the application program automatically; when the second electronic device executes a function of the application program, the second electronic device executes the second-communication platform to transmit a command corresponding to the function to the first-communication platform via the short-distance wireless transmission function, and the first electronic device executes the first-communication platform to transfer the command, which is received via the short-distance wireless transmission function, to the application program in the first electronic device to execute the command for accessing data; and the first electronic device executes the first-communication platform to transmit the data to the second-communication platform of the second electronic device, and the second electronic device executes the second-communication platform to transfer the data to the application program in the second electronic device for the display of the data, wherein the first-communication platform includes a first device label, and the second-communication platform includes a second device label, wherein when the application program is installed in the first electronic device, the application program identifies the first device label and displays at the first electronic device using a first mode corresponding to the first device label, and when the application program is installed in the second electronic device, the application program identifies the second device label and displays at the first electronic device using a second mode corresponding to the second device label, and wherein when the application program is installed in the first electronic device, the first-communication platform identifies and determines whether the application program includes a program label; if so, the first-communication platform transmits the application program to the second-communication platform, such that the second-communication platform executes an installation procedure of the application program automatically.

2. The inter-device communication transmission system of claim 1, wherein when the second-communication platform transmits the command to the first-communication platform, the second-communication platform transmits both an identification label corresponding to the application program and the command to the first-communication platform, such that the first-communication platform identifies the identification label and transfers the command to the application program corresponding to the identification label in the first electronic device, and the first electronic device executes the command by the application program.

3. The inter-device communication transmission system of claim 2, wherein when the first-communication platform transmits the data to the second-communication platform, the first-communication platform transmits both the identification label corresponding to the application program and the data to the second-communication platform, such that the second-communication platform identifies the identification label and transfers the data to the application program corresponding to the identification label in the second electronic device, and the application program displays the data in the second mode.

4. The inter-device communication transmission system of claim 3, wherein the identification label has uniqueness.

5. The inter-device communication transmission system of claim 3, wherein when the first electronic device deletes the application program, the first-communication platform transmits the identification label and a delete command to the second-communication platform, so that the second-communication platform identifies the identification label, and if the second electronic device has the application program corresponding to the identification label installed therein, the second-communication platform deletes the application program of the second electronic device according to the delete command.

6. The inter-device communication transmission system of claim 3, wherein when the first electronic device installs an updated file of the application program, the first-communication platform transmits the identification label and the updated file to the second-communication platform, so that the second-communication platform identifies the identification label, and if the second electronic device has the application program corresponding to the identification label, the second-communication platform installs the updated file automatically.

7. The inter-device communication transmission system of claim 1, wherein the first-communication including the first device label is installed in the first electronic device as a factory default, the second-communication including the second device label is loaded from an application program supply platform by users and installed in the second electronic device.

* * * * *